United States Patent
Seo

(10) Patent No.: US 6,683,676 B1
(45) Date of Patent: Jan. 27, 2004

(54) THREE-DIMENSIONAL IMAGE CAPTURING DEVICE

(75) Inventor: Shuzo Seo, Saitama (JP)

(73) Assignee: Pentax Corporation, Tokyo (JP)

( * ) Notice: Subject to any disclaimer, the term of this patent is extended or adjusted under 35 U.S.C. 154(b) by 519 days.

(21) Appl. No.: 09/717,212

(22) Filed: Nov. 22, 2000

(30) Foreign Application Priority Data

Nov. 24, 1999 (JP) .......................................... P11-332677

(51) Int. Cl.[7] .................................................. G01C 3/08
(52) U.S. Cl. ..................................... 356/5.03; 356/5.01
(58) Field of Search ............................ 356/5.017, 5.04;
396/98, 138, 139; 348/294, 299

(56) References Cited

U.S. PATENT DOCUMENTS

| | | | | |
|---|---|---|---|---|
| 3,884,872 A | * | 5/1975 | Falconio ...................... 524/157 |
| 4,259,592 A | * | 3/1981 | Frungel et al. .............. 250/574 |
| 4,761,546 A | * | 8/1988 | Ikari et al. ................... 356/3.04 |
| 5,699,151 A | * | 12/1997 | Akasu ........................ 356/5.01 |
| 6,281,533 B1 | * | 8/2001 | Miyagawa et al. ......... 257/290 |

OTHER PUBLICATIONS

Christie et al., "Design and Development of a Multi–detecting Two–dimensional Ranging Sensor", Measurement Science Technology, vol. 6, pp. 1301–1308, 1995.

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

A three-dimensional image capturing device comprises a light source irradiating a pulsed light beam, which is reflected by a measurement subject to generate a reflected light beam pulse. In a first distance information sensing operation, a first reflected light component ($E_1$), which corresponds to a distance from the device to the measurement subject and contains a fall of said reflected light beam pulse, is sensed. In a second distance information sensing operation, a second reflected light component ($E_2$), which corresponds to the distance and containing a rise of the reflected light beam pulse, is sensed. The lengths of periods for sensing the reflected light components are identical. A normalized distance information is obtained by calculating $(E_1)/(E_2)$.

5 Claims, 13 Drawing Sheets

THREE-DIMENSIONAL IMAGE CAPTURING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

A three-dimensional measurement using a three-dimensional image capturing device is classified as an active system, in which light, an electric wave or sound is radiated onto a measurement subject, and a passive system in which the light, electric wave or sound is not output. The active system comprises the time-of-flight measurement, a phase detection using a modulated light wave, a triangulation, a moire topography, and soon, and the passive system comprises a stereo vision system, and so on.

An active system device is very bulky in comparison with that of the passive system, since the device requires a laser beam output mechanism. However, the active system device is superior regarding a distance measurement resolution, a measuring time, a measuring range and soon, and thus, despite the bulkiness, the device is utilized in various fields. In a three-dimensional image capturing device, described in "Measurement Science and Technology" (S. Christie et al., vol.6, p.1301–1308, 1995), a pulse-modulation laser beam irradiates a measurement subject, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from the measurement subject, which is positioned far from the device, is less than that of received light based on a reflected light beam from a measurement subject, which is close to the measurement subject, an output corresponding to a distance between the measurement subject and the device can be obtained for each pixel of the CCD.

In a conventional three-dimensional image capturing device as described above, although various kinds of correction information should be sensed to improve accuracy of the distance measurement, a problem would occur in which the process time of the correction information for the distance measurement, becomes excessively long.

SUMMARY OF THE INVENTION

Therefore, an object of the present invention is to reduce the process time of the distance measurement in which a three-dimensional shape of a measurement subject is sensed.

According to the present invention, there is provided a three-dimensional image capturing device, comprising a light source, a first distance information sensing processor, a second distance information sensing processor and a normalized distance information calculating processor.

The light source irradiates a distance measuring light beam, which irradiates a measurement subject and is a pulsed beam. The measurement subject reflects the distance measuring light beam to generate a reflected light beam pulse. The first distance information sensing processor senses a first reflected light component ($E_1$) for a first reflected light sensing period. The first reflected light component corresponds to a distance from the device to the measuring subject and contains a fall of the reflected light beam pulse. The second distance information sensing processor senses a second reflected light component ($E_2$) for a second reflected light sensing period. The second reflected light component corresponds to the distance and contains a rise of the reflected light beam pulse. The length of the second reflected light sensing period is equal to that of the first reflected light sensing period. The normalized distance information calculating processor obtains a ratio ($E_1$)/($E_1$+$E_2$), which is obtained by dividing the first reflected light component ($E_1$) by a sum of the first and second reflected light components ($E_1$+$E_2$), as normalized distance information that corresponds to the distance.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
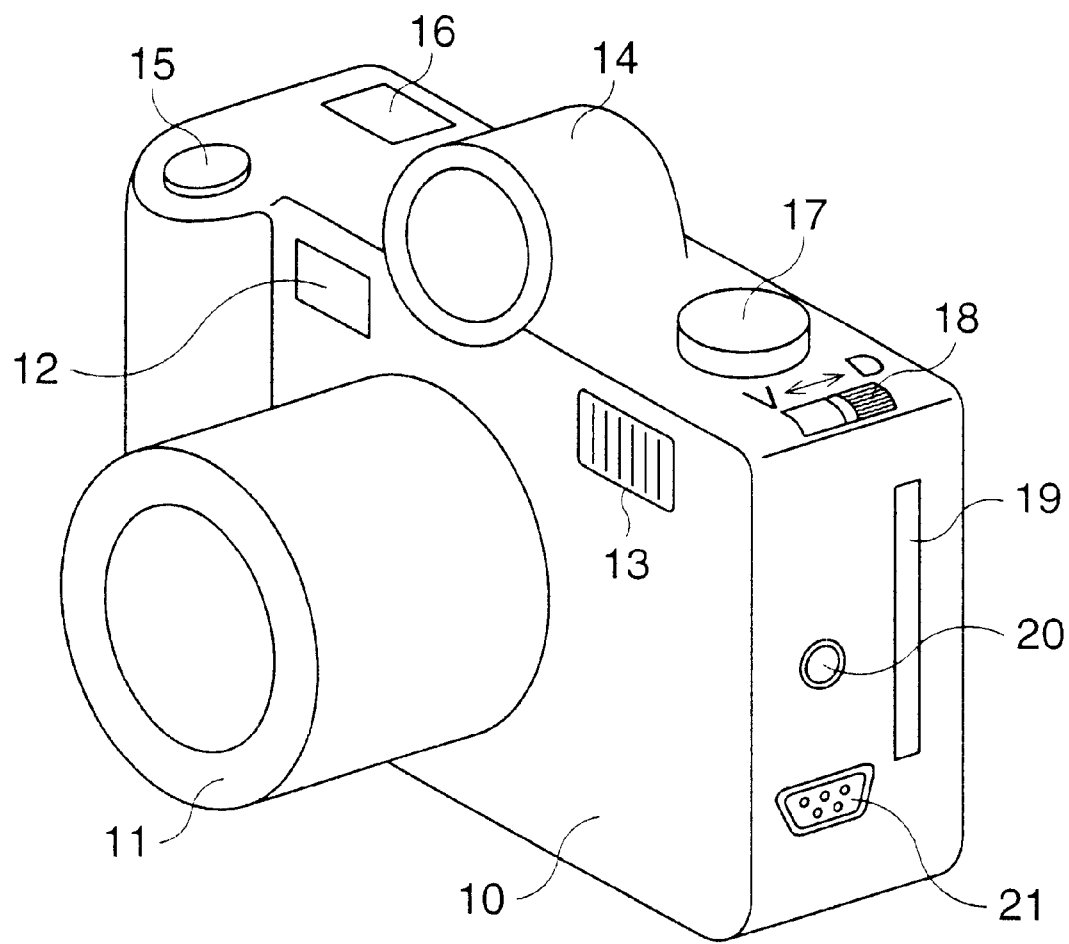
FIG. 1 is a perspective view showing a camera provided with a three-dimensional image capturing device of an embodiment of the present invention.

The present invention will be described below with reference to the embodiments shown in the drawings.

FIG. 1 is an external view of a camera having a three-dimensional image capturing device of an embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed into which a recording medium, such as an IC memory card, is insertable, and a video output terminal 20 and an interface connector 21 are also provided.

Figure 2:
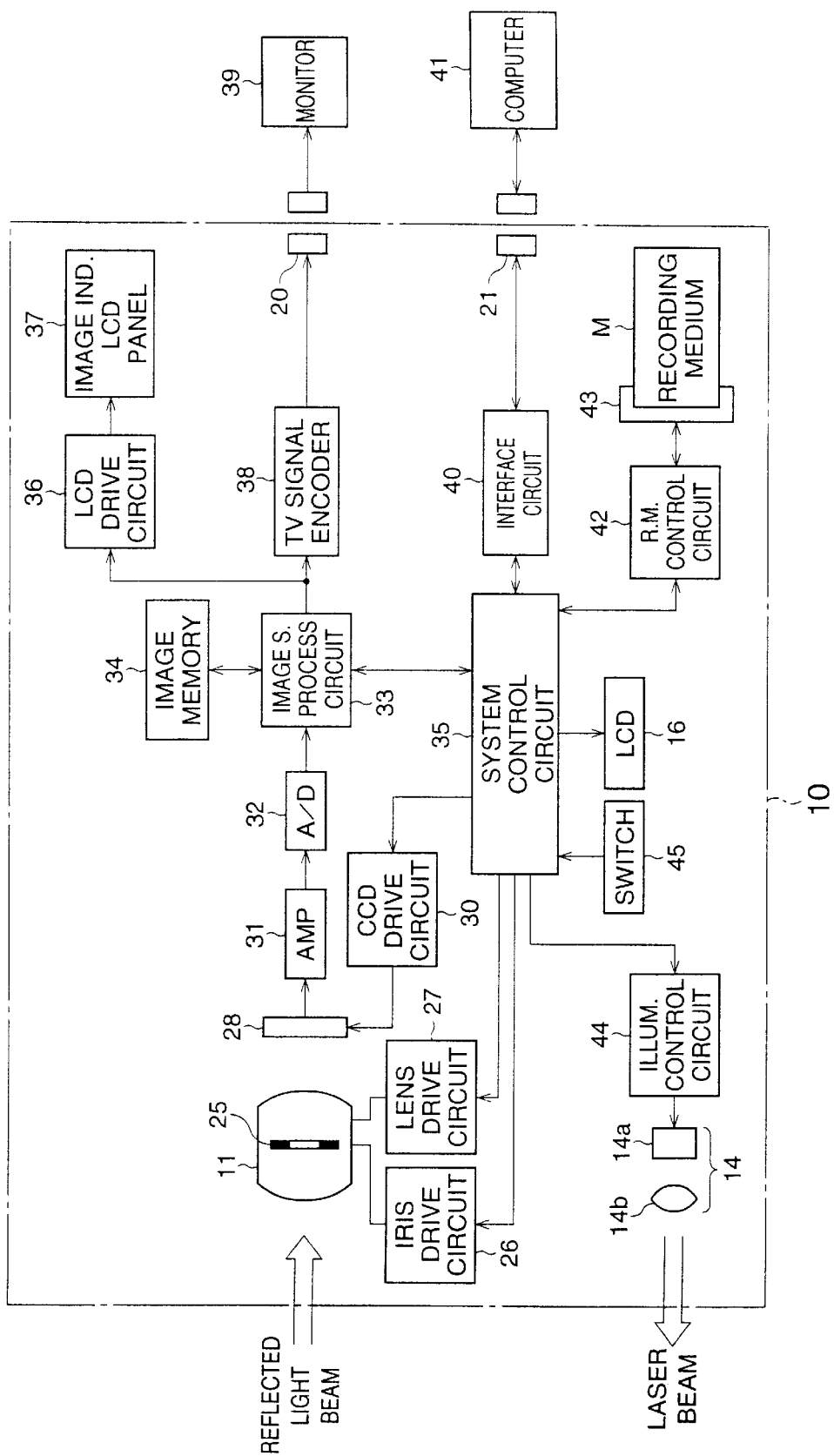
FIG. 2 is a block diagram showing an electrical construction of the camera shown in FIG. 1.

FIG. 2 is a block diagram showing an electrical construction of the camera shown in FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding, to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34 can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A luminous-flux emitting control circuit 44 is connected to the system control circuit 35. The light emitting device 14 is provided with a luminous-flux emitting element 14 a and an illumination lens 14b, and an operation of the luminous-flux emitting element 14a is controlled by the luminous-flux emitting element control circuit 44. The luminous-flux emitting element 14a radiates a laser beam, which is a distance measuring light beam, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later. Note that, in the sensing operation of the three-dimensional image, a control of a transferring operation and so on, in the CCD 28, is performed by the system control circuit 35 and the CCD drive circuit 30.

The liquid crystal display panel 16 and a switch group 45, including the release switch 15, the mode change dial 17 and the V/D mode switch 18, are connected to the system control circuit 35.

Figure 3:
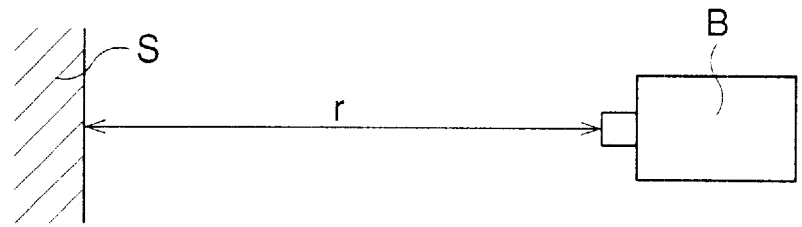
FIG. 3 is a view showing a principle behind a distance measurement.
Figure 4:
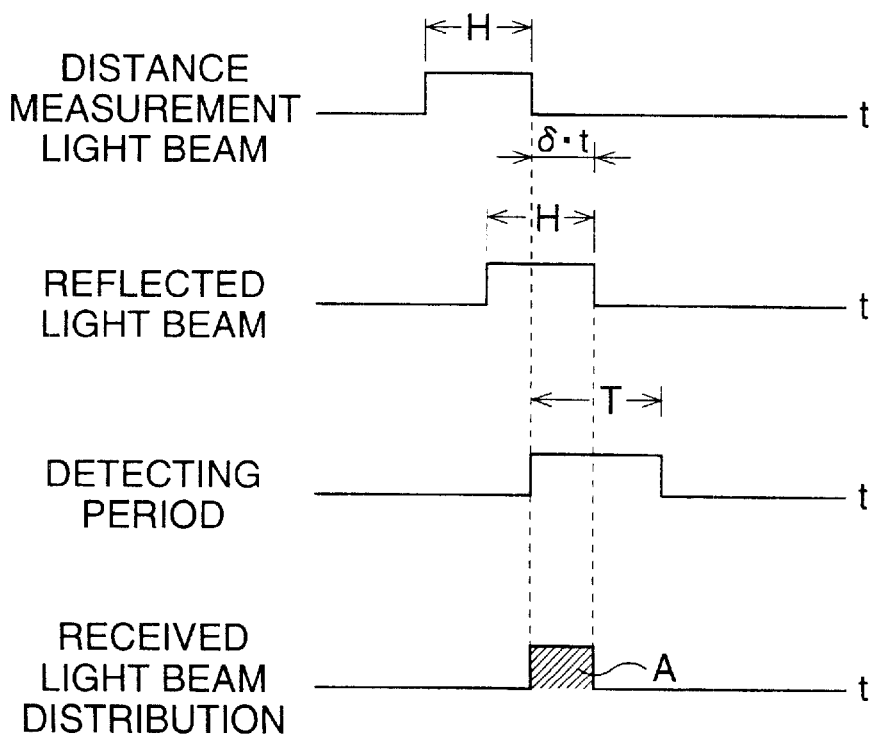
FIG. 4 is a timing chart showing a distance measuring light beam, a reflected light beam, a gate pulse and a distribution of an amount of a light beam received by a CCD.

With reference to FIGS. 3 and 4, a principle behind a distance measurement in the embodiment is described below. Note that, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a fall of the pulse of the reflected light beam occurs after a fall of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C / 2 \tag{1}$$

wherein "C" is the velocity of light.

For example, by setting a condition in such a manner that the reflected light beam can only be sensed from a fall of the pulse of the distance measuring light beam to a point after a fall of the pulse of the reflected light beam so as to sense a component containing the fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the greater the received light amount A.

In this embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
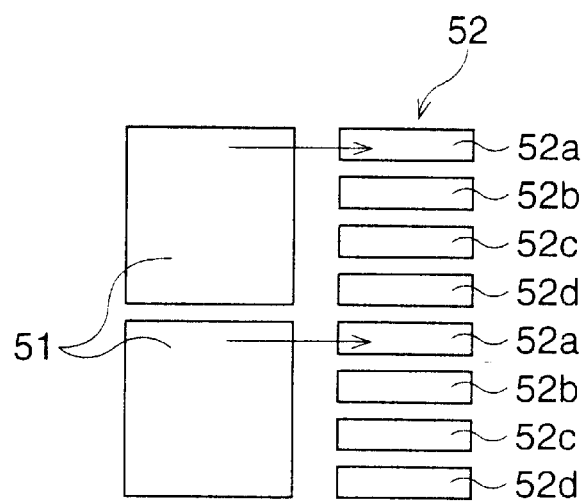
FIG. 5 is a plan view showing a disposition of photo-diodes and a vertical transfer unit, which are provided in the CCD.
Figure 6:
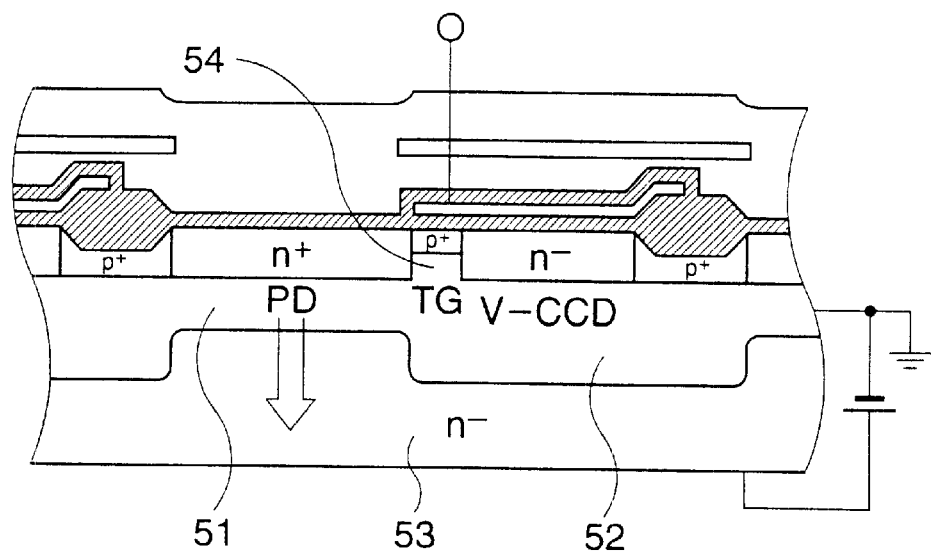
FIG. 6 is a sectional elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overview drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that the number of vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and the amount of the electric charge corresponds to an amount of an incident light beam, which is the reflected light beam reflected by the measurement subject. When the substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electric shuttering operation is performed.

Figure 7:
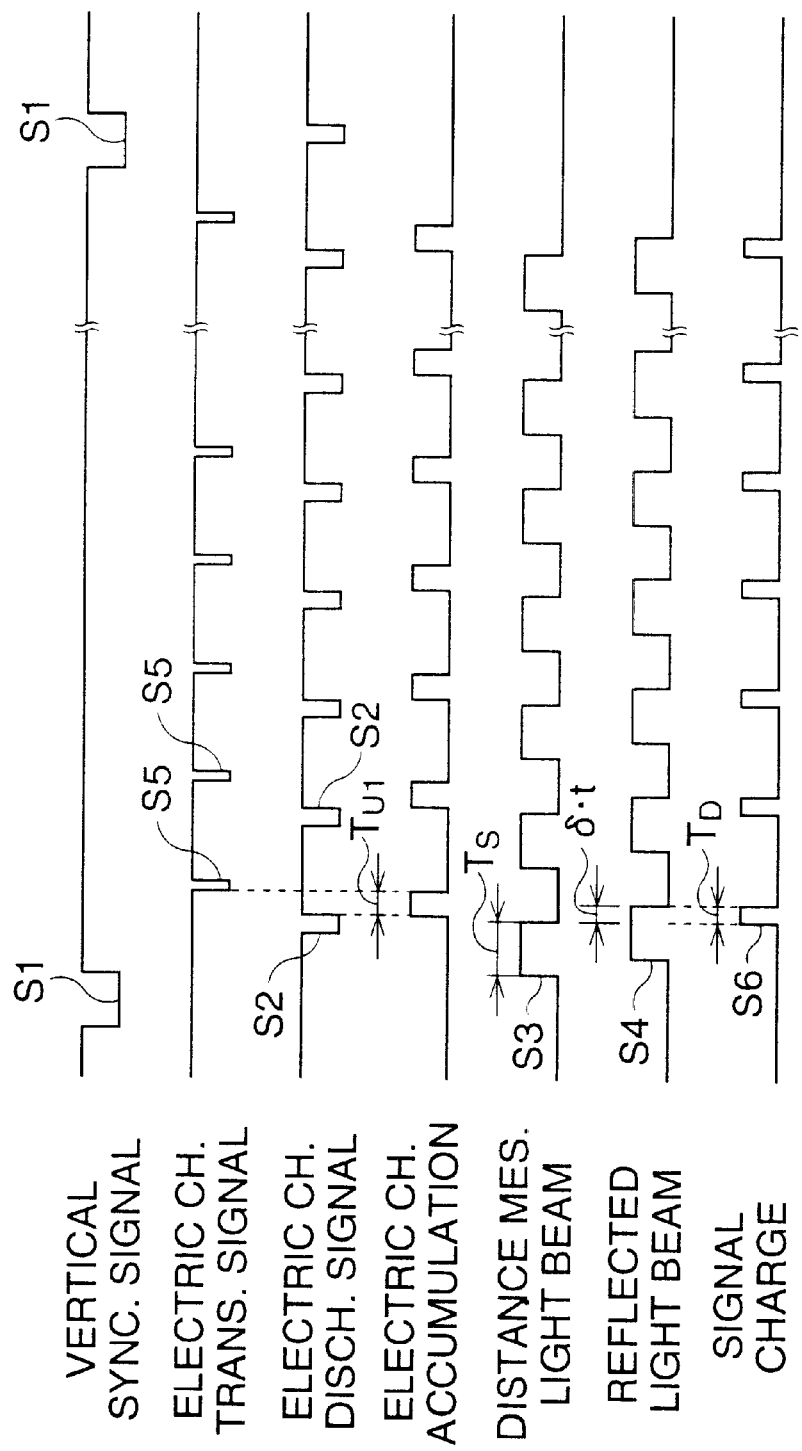
FIG. 7 is a timing chart of a distance information sensing operation.

FIG. 7 is a timing chart of a distance information sensing operation by which data, corresponding to the distance from the camera body 10 to each point on a surface of the measurement subject, is sensed. The distance information sensing operation is described below with reference to FIG. 1, 2, 5, 6 and 7.

In synchronization with an output of a vertical synchronizing signal S1, the light emitting device 14 is actuated, and thus a distance measuring light S3, which is a pulsed beam having a constant width, is output therefrom. The distance measuring light S3 is reflected by the measurement subject, and enters the CCD 28 as a reflected light beam S4. In synchronization with a timing at which the output of the distance measuring light S3 is completed, an electric charge discharging signal (a pulse signal) S2 is output. The output of the electric charge discharging signal S2 is controlled to be complete at the same time the output of the distance measuring light S3 is complete. Due to this, unwanted charge accumulated in the photo-diodes 51, is discharged to the substrate 53. When a predetermined time has elapsed since the output of the distance measuring light S3, an electric charge transfer signal (pulse signal) S5 is output, so that an electric charge accumulated in the photo-diodes 51 is transferred to the vertical transfer unit 52. Note that the electric charge transfer signal S5 is output after the pulse of the reflected light S4 is completed.

Thus, for a period $T_{U1}$ from the end of the output of the electric charge discharging signal S2 to the beginning of the output of the electric charge transfer signal S5, a signal charge corresponding to distance from the camera body 10 to the measurement subject is accumulated. Namely, the electric charge accumulating period $T_{U1}$ is started at the same time a period $T_S$, for which the distance measuring light S3 is output, ends, and during the electric charge accumulating period $T_{U1}$, only a part of the reflected light S4 is detected by the CCD 28. A signal charge S6, generated by the detected light beam, corresponds to the distance from the camera body 10 to the measurement subject. In other words, the signal charge S6, corresponding to a light beam, which is included in the reflected light beam S4 coming from the measurement subject and reaches the photo-diodes 51 within the electric charge accumulation period $T_{U1}$, is accumulated in the photo-diodes 51. The signal charge S6 is transferred to the vertical transfer unit 52 by the electric charge transfer signal S5.

After a predetermined time has elapsed since the output of the electric charge transfer signal S5, the electric charge discharging signal S2 is again output, so that unwanted charge, which is accumulated in the photo-diodes 51 after the transfer of the signal charge S6 to the vertical transfer unit 52, is discharged to the substrate 53. Thus, another charge is accumulated in the photo-diodes 51. Then, similarly to the above description, when the electric charge accumulation period $T_{U1}$ has again elapsed, the signal charge S6 is transferred to the vertical transfer unit 52.

The transferring operation of the signal charge S6 to the vertical transfer unit 52 is repeatedly performed until the next vertical synchronizing signal S1 is output. Thus, the signal charge S6 is integrated in the vertical transfer unit 52. The signal charge S6 integrated for ona field period, which is between two vertical synchronizing signals S1, corresponds to distance information of the measurement subject, on condition that the measurement subject is stationary for the period between the two vertical synchronizing signals S1.

The detecting operation of the signal charge S6 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the three-dimensional image capturing device, as a three-dimensional image data of the measured subject.

The reflected light beam, sensed by the CCD 28 as described above, maybe affected by a reflectance of the surface of the measurement subject. Therefore, the distance information, obtained through the reflected light beam, may contain an error resulting from the reflectance. Further, the reflected light beam sensed by the CCD 28 may contain an extra component, such as ambient daylight, being other than the reflected light beam from the measurement subject, which can cause an error. Accordingly, in the distance information sensing operation, it is preferable that influences of the reflectance of the surface of the measurement subject, the ambient daylight and so on, are corrected. A distance information sensing operation, in which the correction is performed, is described below.

Figure 8:
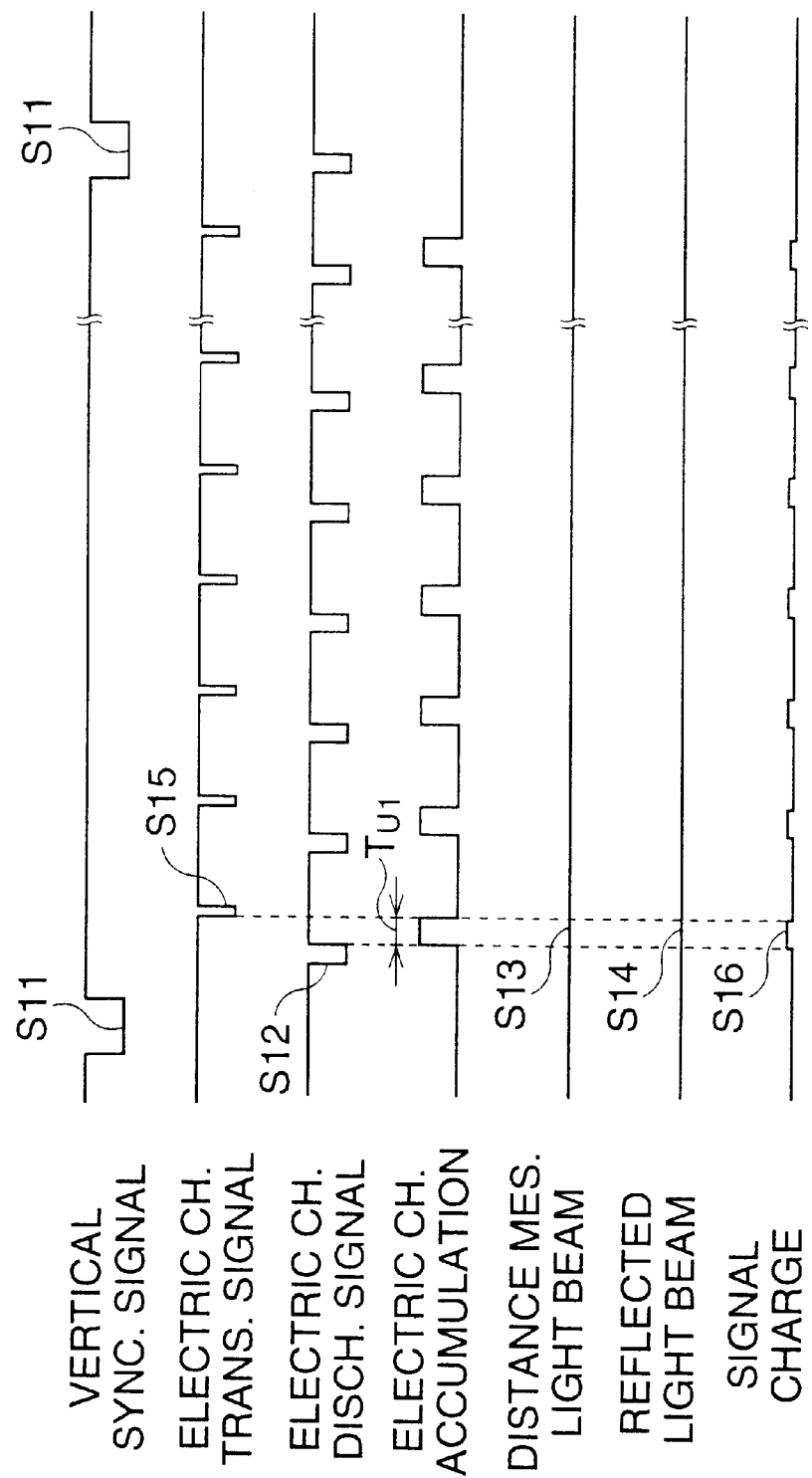
FIG. 8 is a timing chart of a distance correction information sensing operation.
Figure 9:
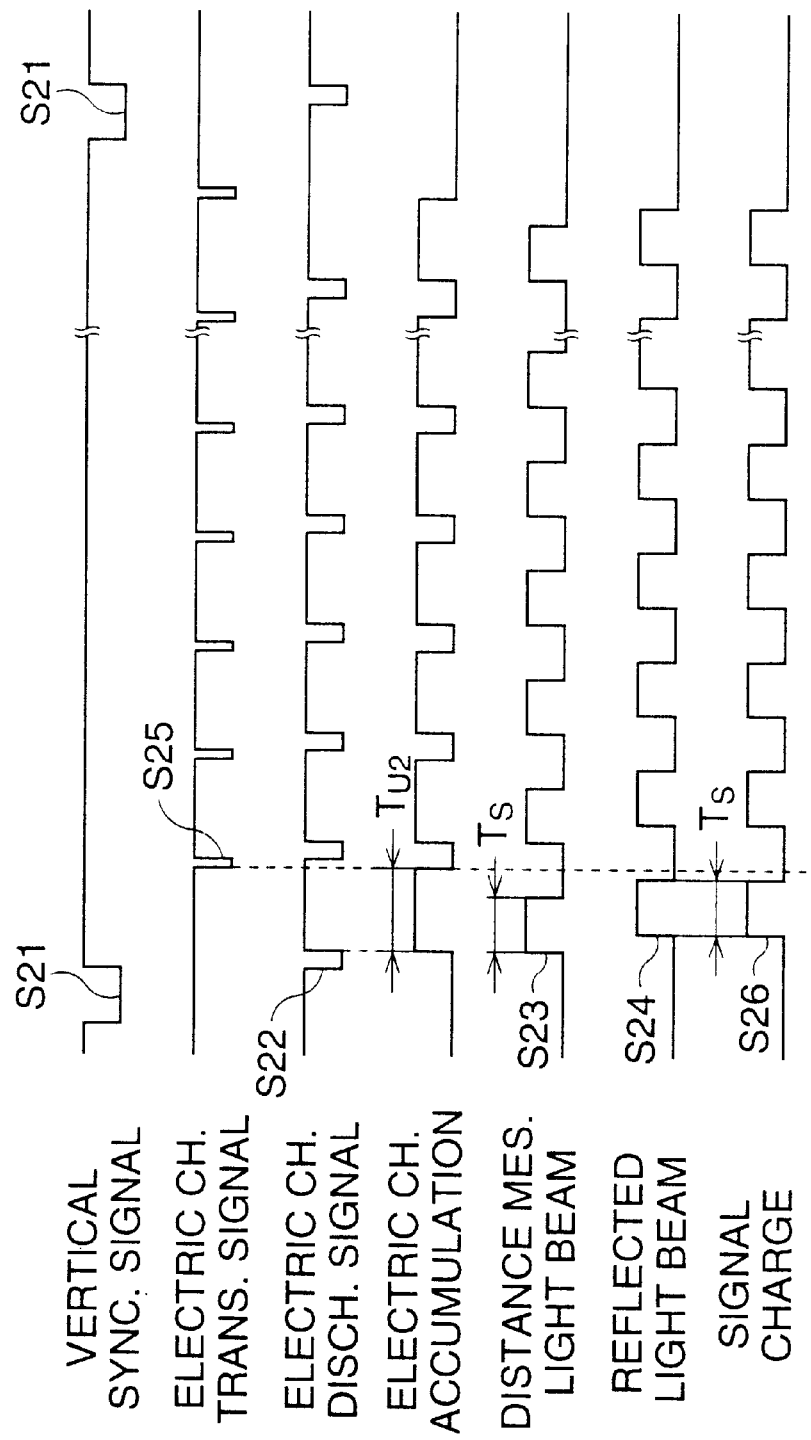
FIG. 9 is a timing chart of a reflectance information sensing operation.
Figure 10:
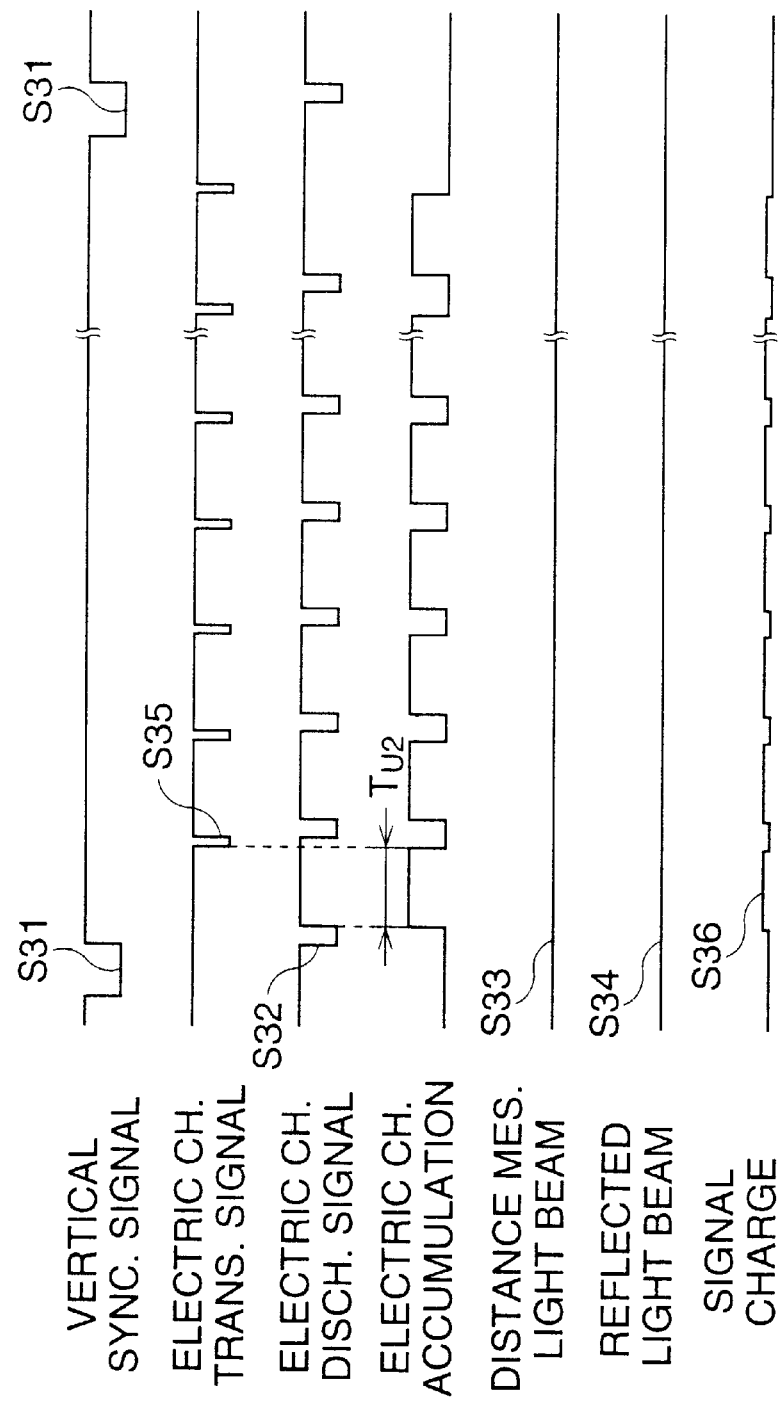
FIG. 10 is a timing chart of a reflectance correction information sensing operation.
Figure 11A:
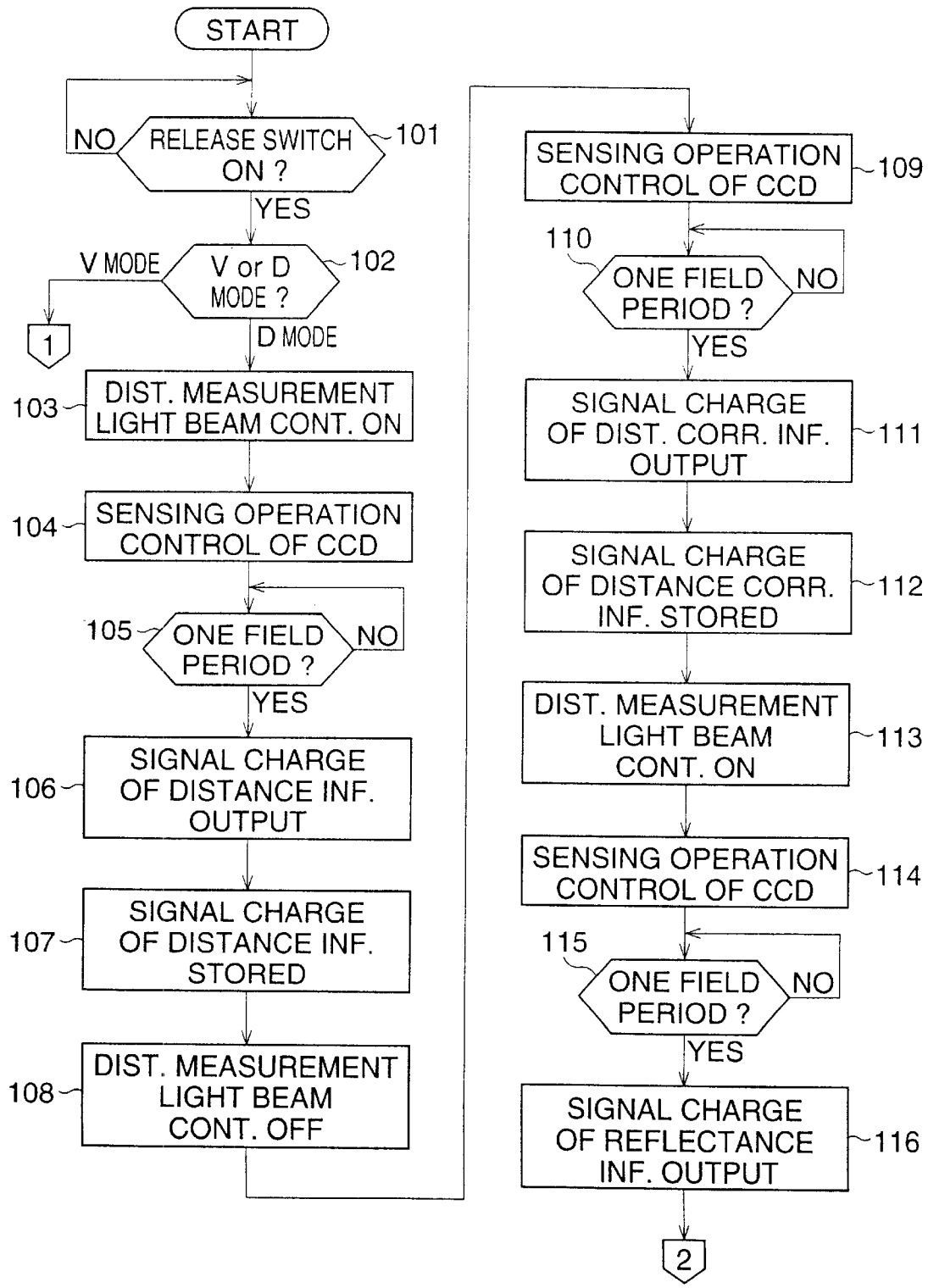
FIGS. 11A and 11B show a flowchart of the distance information sensing operation.
Figure 11B:
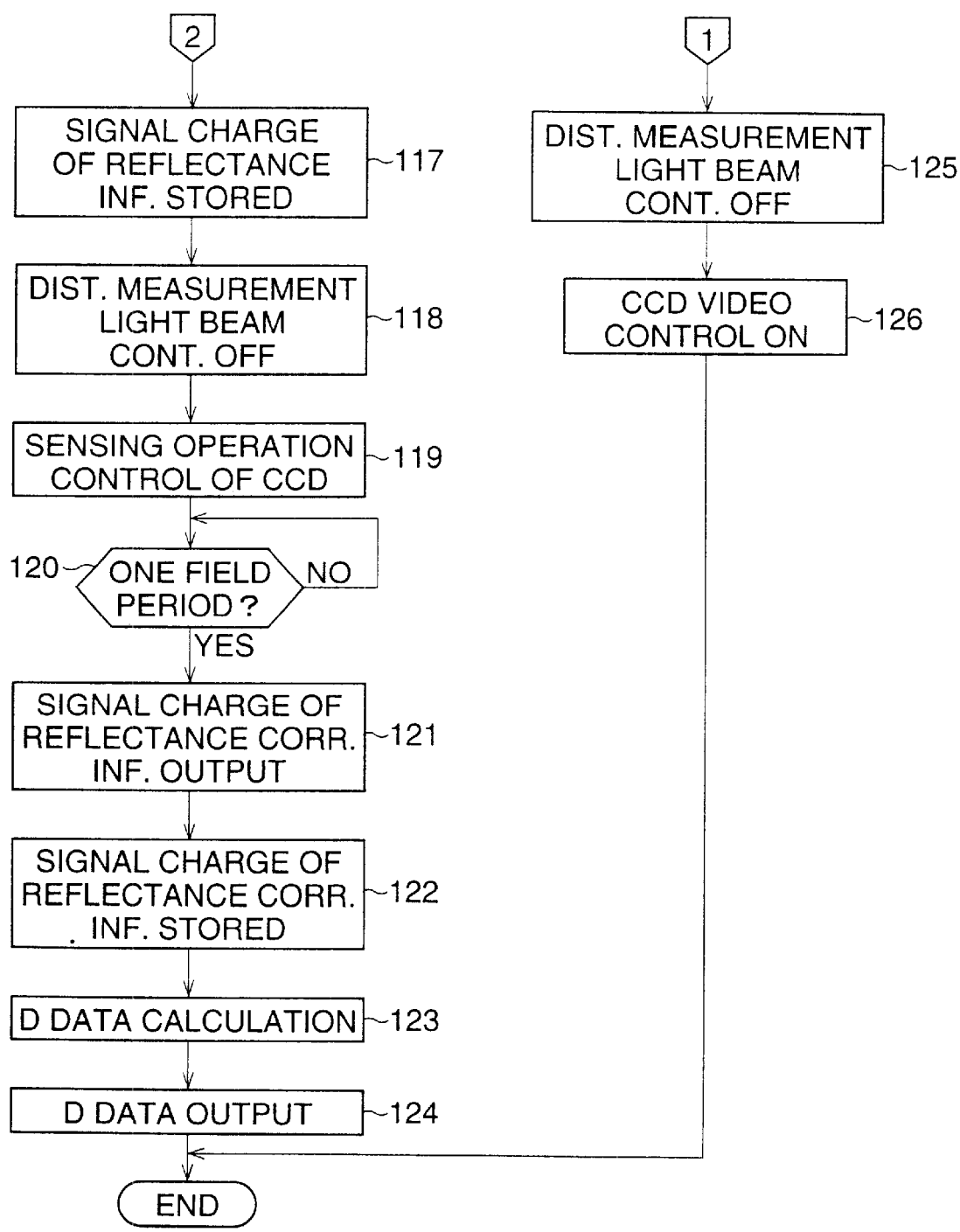

FIGS. 8, 9 and 10 show operations of distance correction information, reflectance information and reflectance correction information, respectively. FIGS. 11A and 11B show a flowchart of the distance information sensing operation. With reference to FIGS. 1, 2, 7, 8, 9, 10, 11A and 11B, the distance information sensing operation, in which influences of the reflectance of the surface of the measurement subject, the ambient daylight and so on, are corrected, is described.

When it is recognized in Step 101 that the release switch 15 is fully depressed, Step 102 is executed in which it is determined which mode is selected, a video (V) mode or a distance measurement (D) mode. A change between the modes is carried out by operating the V/D mode switch 18.

When the D mode is selected, Step 103 is executed in which the vertical synchronizing signal S1 is output and a distance measuring light beam control is started. Namely, the light emitting device 14 is driven so that the distance measuring light beam S3 is intermittingly output as a pulsed beam. Then, Step 104 is executed so that a sensing operation control of the CCD 28 is started. Namely, the distance information sensing operation described with reference to FIG. 7 is started, and thus the electric charge discharging signal S2 and the electric charge transfer signal S5 are alternately output, so that the signal charge S6 of the distance information is integrated in the vertical transfer unit 52.

In Step 105, it is determined whether one field period has elapsed since the beginning of the distance information sensing operation, i.e., whether a new vertical synchronizing signal S1 has been output. When one field period has passed, the process goes to Step 106 in which the signal charge S6 of the distance information is output from the CCD 28. The signal charge S6 is then stored in the image memory 34 in Step 107. Then, in Step 108, the distance measuring light beam control is turned OFF, and thus the light emitting operation of the light emitting device 14 is stopped.

In Steps 109 through 112, the distance correction information sensing operation is performed. In Step 109, as shown in FIG. 8, the vertical synchronizing signal S11 is output, and a sensing operation control of the CCD 28 is started. Namely, an electric charge discharging signal S12 and an electric charge transfer signal S15 are alternately output while the light emitting operation of the light emitting device 14 is not carried out, i.e., while the light source is not illuminated. Although the electric charge accumulation period $T_{U1}$ is the same as that of the distance information sensing operation shown in FIG. 7, the distance measuring light beam does not irradiate the measurement subject (reference S13), and thus there is no reflected light beam (reference S14). Therefore, although a signal charge of the distance information is not generated, a signal charge S16 corresponding to an interference or noise component is generated, since the noise component, such as ambient daylight, enters the CCD 28. The signal charge S16 corresponds to distance correction information, which is used for correcting an error generated in the distance information due to the noise component, and is related to the electric charge accumulation period $T_{U1}$.

In Step 110, it is determined whether one field period has elapsed since the beginning of the distance correction information sensing operation, i.e., whether a new vertical synchronizing signal S11 has been output. When one field period has passed, the process goes to Step 111 in which the signal charge S16 of the distance correction information is output from the CCD 28. The signal charge S16 is then stored in the image memory 34 in Step 112.

In Steps 113 through 117, the reflectance information sensing operation is performed. In Step 113, as shown in FIG. 9, a vertical synchronizing signal S21 is output, and a distance measuring light beam control of the CCD 28 is started, so that a distance measuring light beam S23 is intermittently output as a pulsed beam. In Step 114, a sensing operation control of the CCD 28 is started, and thus an electric charge discharging signal S22 and an electric charge transfer signal S25 are alternately output. The reflectance information sensing operation is controlled in such a manner that all of the reflected light beam S24 is received within an electric charge accumulation period $T_{U2}$, which is from an end of an output of the electric charge discharging signal S22 to a beginning of an output of the electric charge transfer signal S25. Namely, a width $T_S$ of the signal charge S26 accumulated in each of the photo-diodes 51 of the CCD 28 is the same as a width $T_S$ of the distance measuring light beam S23.

Therefore, the signal charge S26 does not depend upon the distance "r" of the measurement subject, and corresponds only to the reflectance information which depends on the reflectance of the surface of the measurement subject.

In Step 115, it is determined whether one field period has elapsed since the beginning of the reflectance information sensing operation, i.e., whether a new vertical synchronizing signal S21 has been output. When one field period has passed, the process goes to Step 116 in which the signal charge S26 of the reflectance information is output from the CCD 28. The signal charge S26 is then stored in the image memory 34 in Step 117. Then, in Step 118, the distance measuring light beam control is turned OFF, and thus the light emitting operation of the light emitting device 14 is stopped.

In Steps 119 through 122, the reflectance correction information sensing operation is performed. In Step 119, as shown in FIG. 10, a vertical synchronizing signal S31 is output, and a sensing operation control of the CCD 28 is started. Namely, an electric charge discharging signal S32 and an electric charge transfer signal S35 are alternately output while the light emitting operation of the light emitting device 14 is not carried out. Although the electric charge accumulation period $T_{U2}$ is the same as that of the reflectance information sensing operation shown in FIG. 9, the distance measuring light beam does not irradiate the measurement subject (reference S33), and thus there is no reflected light beam (reference S34). Therefore, although a signal charge of the reflectance information is not generated, a signal charge S36 corresponding to an interference component or a noise component is generated, since the noise component, such as ambient daylight, enters the CCD 28. The signal charge S36 corresponds only to reflectance correction information, which is used for correcting an error generated in the reflectance information due to the noise component, and is related to the electric charge accumulation period $T_{U1}$.

In Step 120, it is determined whether one field period has elapsed since the beginning of the reflectance correction information sensing operation, i.e., whether a new vertical synchronizing signal S31 has been output. When one field period has passed, the process goes to Step 121 in which the signal charge S36 of the reflectance correction information is output from the CCD 28. The signal charge S36 is stored in the image memory 34 in Step 122.

In Step 123, a calculation process of the distance measurement (D) data is performed using the distance information, the distance correction information, the reflectance information and the reflectance correction information, which are obtained in Steps 103 through 122. The D data is output in Step 124, and the sensing operation ends. Conversely, when it is determined in Step 102 that the V mode is selected, the distance measuring light beam control is turned OFF in Step 125, and a normal photographing operation (i.e., CCD video control) using the CCD 28 is turned ON. Then, the sensing operation ends.

With reference to FIGS. 7 through 10, the contents of the calculation executed in Step 123 are described below.

It is supposed that the measurement subject of reflectance R is illuminated and an image of the measurement subject is formed on the CCD 28 while deeming that the measurement subject is a secondary light source. At this time, an output Sn, which is obtained by integrating an electric charge generated in a photo-diode for an electric charge accumulation period "t", is indicated as follows:

$$Sn = k \cdot R \cdot I \cdot t \qquad (2)$$

wherein "k" is a proportional coefficient, which is varied in accordance with an F-number and a magnification of the photographing lens.

When the measurement subject is illuminated by light output from a light source, such as an infrared laser source, the luminance I is obtained by combining a luminance $I_S$, due to the light source and a luminance $I_B$ due to the ambient daylight, which is indicated as follows:

$$I = I_S + I_B \qquad (3)$$

As shown in FIG. 7, it is supposed that the electric charge accumulation period is $T_{U1}$, the pulse width of the distance measuring light beam S3 is $T_S$, a pulse width of the signal charge S6 of the distance information is $T_D$, and the electric charge accumulation period is repeated N times for one field period. An output $SM_{10}$ of the CCD is:

$$SM_{10} = \sum (k \cdot R(I_S \cdot T_D + I_B \cdot T_{U1})) \qquad (4)$$
$$= k \cdot N \cdot R(I_S \cdot T_D + I_B \cdot T_{U1})$$

wherein the pulse width $T_D$ is indicated as follows:

$$T_D = T_{U1} - \delta \cdot t \qquad (5)$$
$$= T_{U1} - 2r/C$$

As shown in FIG. 9, when the electric charge accumulation period $T_{U2}$ is greater than the pulse width $T_S$, such that the electric charge accumulation period $T_{U2}$ is large enough to receive the whole of the reflected light beam, an output $SM_{20}$ of the CCD is:

$$SM_{20} = \sum (k \cdot R(I_S \cdot T_S + I_B \cdot T_{U2})) \qquad (6)$$
$$= k \cdot N \cdot R(I_S \cdot T_S + I_B \cdot T_{U2})$$

As shown in FIG. 8, when the light beam is turned OFF to carry out a pulse-shaped electric charge accumulation, having a same width as that of FIG. 7, an output $SM_{11}$ of the CCD is:

$$SM_{11} = \sum (k \cdot R \cdot I_B \cdot T_{U1}) \qquad (7)$$
$$= k \cdot N \cdot R \cdot I_B \cdot T_{U1}$$

Similarly, an output $SM_{21}$ of the CCD, which is obtained when an electric charge accumulation shown in FIG. 10 is performed, is:

$$SM_{21} = \sum (k \cdot R \cdot I_B \cdot T_{U2}) \qquad (8)$$

-continued
$$= k \cdot N \cdot R \cdot I_B \cdot T_{U2}$$

Based on the formulas (4), (6), (7) and (8), a following formula is obtained:

$$S_D = (SM_{10} - SM_{11})/(SM_{20} - SM_{21}) \qquad (9)$$
$$= T_D/T_S$$

As described above, the distance measuring light beam S3 and the reflected light beam S4 contain noise, such as ambient daylight (i.e., a luminance $I_B$ due to ambient day light). $T_D/T_S$ included in the formula (9) indicates that an amount of the reflected light beam S4 from the measurement subject, when the distance measuring light beam S3 is radiated, is normalized by an amount of the distance measuring light beam S3, and is equal to a ratio of a value in which the noise component ($SM_{11}$) (corresponding to the electric charge S16 shown in FIG. 8) is subtracted from the amount of the distance measuring light beam S3 ($SM_{10}$) (corresponding to the signal charge S6 shown in FIG. 7), to a value in which the noise component ($SM_{21}$) (corresponding to the electric charge S36 shown in FIG. 10) is subtracted from an amount of the reflected light beam S4 ($SM_{20}$) (corresponding to the signal charge S27 shown in FIG. 9).

$SM_{10}$, $SM_{11}$, $SM_{20}$ and $SM_{21}$ included in the formula (9) are it stored as the distance information, the distance correction information, the reflectance information and the reflectance correction information, in Steps 107, 112, 117 and 122, respectively. Therefore, based on the information, $T_D/T_S$ is obtained. Since the pulse width $T_S$ is known, the distance "r" is obtained from formula (5) and $T_D/T_S$.

Thus, based on the formula (5) and (9), the distance "r" from the camera body to each point on the surface of the measurement subject is corrected, so that an accuracy of a distance sensing is improved.

Figure 12:
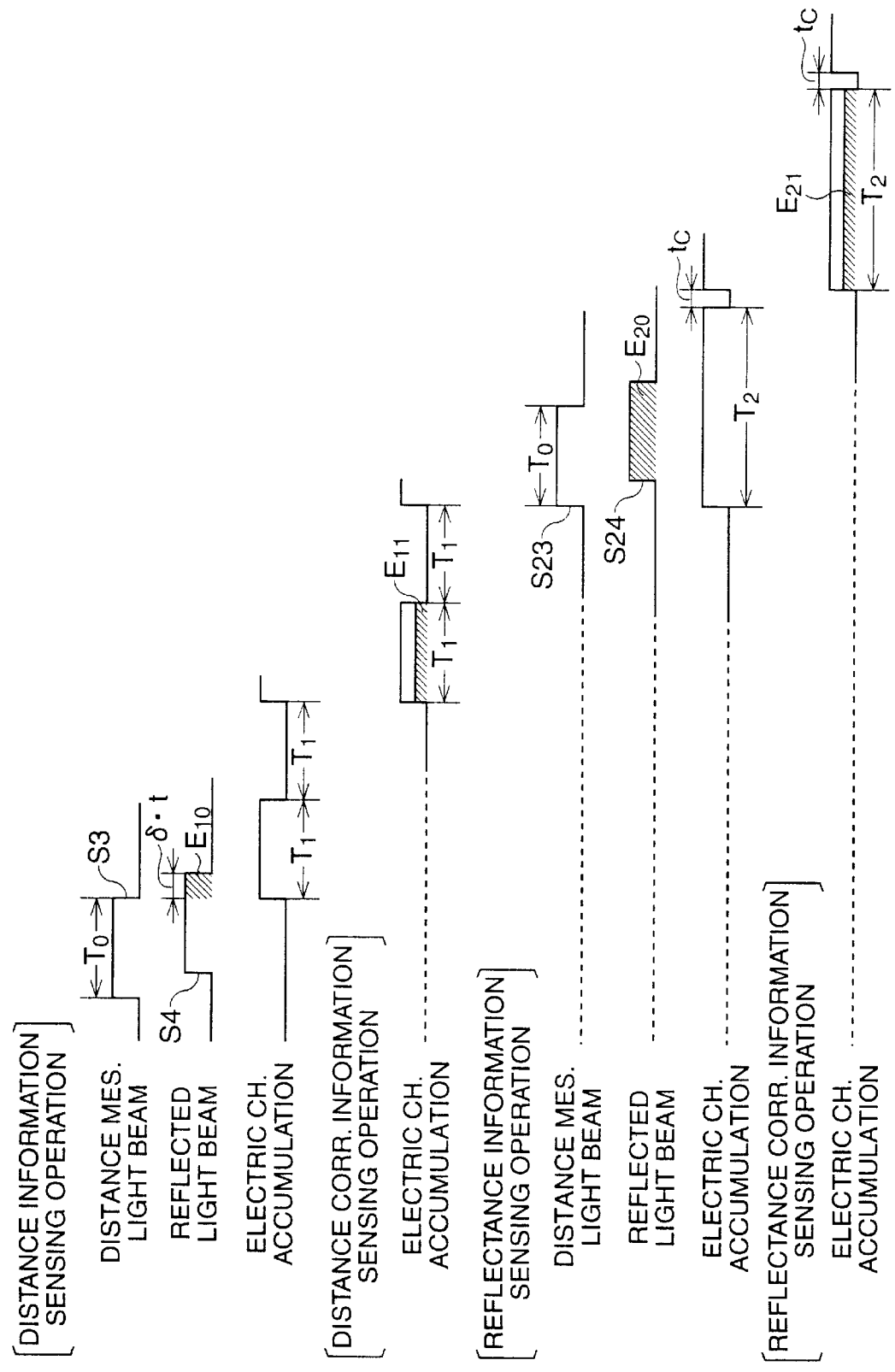
FIG. 12 is a view showing execution times of the distance information sensing operation, the distance correction information sensing operation, the reflectance information sensing operation and the reflectance correction information sensing operation.

FIG. 12 shows execution times of the distance information sensing operation, the distance correction information sensing operation, the reflectance information sensing operation and the reflectance correction information sensing operation. For clarity, even though a large number of pulses are output, only one pulse is drawn.

In the distance information sensing operation, due to the output of the distance measuring light beam S3 of the pulse width $T_0$, the reflected light beam S4, having the same pulse width, enters the CCD. The electric charge accumulation period (i.e., a reflected light sensing period) is started simultaneously with a fall of the pulse of the distance measuring light beam S3. The length of the electric charge accumulation period is $T_1$. During the electric charge accumulation period, an electric charge corresponding to a reflected light component $E_{10}$, which corresponds to a distance from the camera to the measurement subject and contains a fall of the pulse of the reflected light beam S4, is accumulated in each of the photo-diodes of the CCD (a period δ·t). After the electric charge accumulation period, the distance measuring light beam S3 is again output during an electric charge accumulation stop period $T_1$, having the same length as that of the electric charge accumulation period. Then, the operation described above is repeated. Namely, the electric charge accumulation stop period $T_1$ is approximately the same length as that of the pulse width $T_0$.

In the distance correction information sensing operation, while the distance measuring light is not output, an electric charge is performed in the CCD for the electric charge accumulation period (i.e., an ambient daylight sensing period) the length of which is equal to that of the reflected light sensing period. Due to this, in each of the photo-diodes of the CCD, an electric charge, corresponding to a noise component $E_{11}$ such as ambient light around the measurement subject, is accumulated. After the electric charge accumulation period, in a similar way as the distance measurement information sensing operation, the electric charge accumulation stop period $T_1$, having the same length as that of the electric charge accumulation period, is provided. Then, the operation described above is repeated. The electric charge accumulation stop period $T_1$ is provided, to output the electric charge discharging signals S2 and S12 (see FIGS. 7 and 8) and the electric charge transfer signals S5 and S15 (see FIGS. 7 and 8) under the same control conditions for the distance correction information sensing operation and the distance information sensing operation.

In the reflectance information sensing operation, the distance measuring light beam S23 having the pulse width $T_0$, is output so that the reflected light beam S24 having the same pulse width enters the CCD. However, different from the distance information sensing operation, the electric charge accumulation period (i.e., a reflected light sensing period) is started simultaneously with a rise of the pulse of the distance measuring light beam S23, and continues until after the fall of the pulse of the reflected light beam S24. The length of the electric charge accumulation period is $T_2$, which is greater than or equal to the sum of the pulse widths of the distance measuring light beam S23 and the reflected light beam S24. That is, $T_2 \geq 2T_1$. Accordingly, an electric charge corresponding to all the reflected light component $E_{20}$ is accumulated. After the electric charge accumulation period, the distance measuring light beam S23 is again output after an electric charge accumulation stop period $t_C$, which has a predetermined length. Then, the distance measuring light beam S23 is again output, and after that, the operation described above is repeated.

In the reflectance correction information sensing operation, while the distance measuring light is not output, an electric charge is performed in the CCD for the electric charge accumulation period having the same length as that of the reflectance information sensing period. Due to this, in each of the photo-diodes of the CCD, an electric charge corresponding to a noise component $E_{21}$, such as ambient light, which affects the reflected light component $E_{20}$, is accumulated. After the electric charge accumulation period, the operation described above is repeated after an electric charge accumulation stop period $t_C$, which has a predetermined length.

The reflected light components $E_{10}$ and $E_{20}$ and the noise components $E_{11}$ and $E_{21}$ correspond to the outputs $SM_{10}$, $SM_{20}$, $SM_{11}$ and $SM_{21}$ respectively, which are obtained in operations such as the distance information sensing operation described with reference to FIGS. 1, 2, 7 through 11A and 11B. Namely, a normalized distance information RS is $$RS=(E_{10}-E_{11})/(E_{20}-E_{21})$$

$(E_{10}-E_{11})$ and $(E_{20}-E_{21})$ are expressed as follows using a reflectance R, a luminance I of the measurement subject and a proportional coefficient k, similarly to the formula (2).

$$E_{10}-E_{11}=k \cdot R \cdot I \cdot (\delta \cdot t)$$

$$E_{20}-E_{21}=k \cdot R \cdot I \cdot T$$

Therefore, the normalized distance information RS is $$RS=(\delta \cdot t)/T$$

On the other hand, a period $T_X$, required for executing the distance information sensing operation, the distance correction information sensing operation, the reflectance information sensing operation and the reflectance correction information sensing operation, is in proportion to $$T_X = 4 \times T_1 + 2 \times T_2$$

which is the sum of the periods shown in FIG. 12. When it is supposed that $T_2 \approx 2 \times T_1$, and $t_C \approx 0$, the required period $T_X$ is in proportion to $$T_X = 8 \times T_1 \qquad (11)$$

In this embodiment, for reducing the period required for the execution of each of the operations, the distance information sensing operation is performed in two different modes, as described below with reference to FIG. 13.

Figure 13:
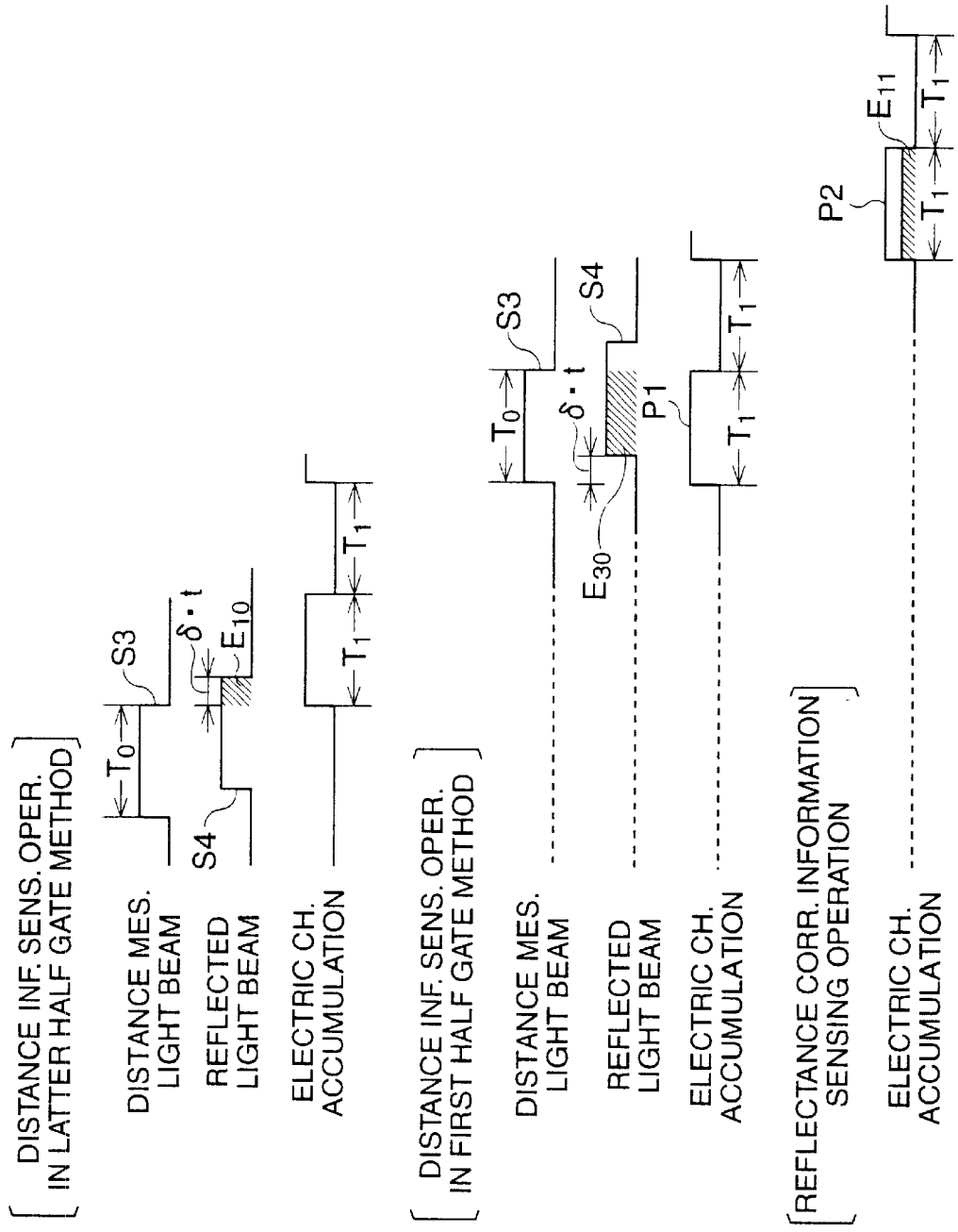
FIG. 13 is a view showing execution times of the distance information sensing operation and the distance correction information sensing operation in a latter half gate method and a first half gate method.

As shown in FIG. 13, the distance information sensing operation is performed in a latter half gate method (or a first distance information sensing mode), and a first half gate method (or a second distance information sensing mode).

The latter half gate method corresponds to the distance information sensing operation shown in FIG. 12. In the latter half gate method, an electric charge corresponding to a first reflected light component $E_{10}$, which contains a fall of the pulse of the reflected light beam S4 generated in accordance with the distance measurement light beam S3 of the pulse width $T_0$, is accumulated in each of the photo-diodes of the CCD. Conversely, in the first half gate method, the electric charge accumulation period (i.e., the reflected light sensing period) P1 is started simultaneously with a rise of a pulse of the distance measurement light beam S3 having the pulse width $T_0$, and ends almost simultaneously with a fall of the pulse of the distance measurement light beam S3. Namely, in the reflected light component, a second reflected light component $E_{30}$, which is from the rise of the pulse to the end of the electric charge accumulation period P1. The second reflected light component $E_{30}$ corresponds to a distance from the camera to the measurement subject, similarly to the first reflected light component $E_{10}$. The length of the electric charge accumulating period in the latter half gate method is equal to that of the electric charge accumulating period in the first half gate method.

In the distance correction information sensing operation, while the distance measuring light is not output, an electric charge is performed in the CCD for the electric charge accumulation period (i.e., an ambient daylight sensing period) P2 the length of which is equal to those of the reflected light sensing periods in the latter half gate method and the first half gate method. Due to this, in each of the photo-diodes of the CCD, an electric charge corresponding to a noise component $E_{11}$, such as ambient light around the measurement subject, is accumulated. Since the length of the ambient daylight sensing period P2 is equal to that of the electric charge accumulation period in each of the latter half gate method and the first half gate method, the noise component $E_{11}$ can be utilized as a correction to the first reflected light component $E_{10}$ and the second reflected light component $E_{30}$.

A component, which is obtained by subtracting the noise component $E_{11}$ from the first reflected light component $E_{10}$ obtained in the distance information sensing operation in the latter half gate method, is deemed as a corrected first reflected light component $E_1$. A component, which is obtained by subtracting the noise component $E_{11}$ from the second reflected light component $E_{30}$ obtained in the distance information sensing operation in the first half gate method, is deemed as a corrected second reflected light component $E_2$. As described above, in the latter half gate method and the first half gate method, the lengths of the electric charge accumulation periods are identical. Therefore, the corrected first and second reflected light components $E_1$ and $E_2$ are expressed as follows using the reflectance R, the luminance I of the measurement subject and the proportional coefficient k, similar to the formula (2).

$$E_1 = k \cdot R \cdot I \cdot (\delta \cdot t) \quad (12)$$

$$E_2 = k \cdot R \cdot I \cdot T \quad (13)$$

A ratio $RT = E_1/(E_1+E_2)$, which is obtained by dividing the first reflected light component $E_1$ by the sum of the first and second reflected light components $(E_1+E_2)$, is $$RT = (\delta \cdot t)/T_1 = (\delta \cdot t)/T_0 \quad (14)$$

This formula is identical to the formula (10). Namely, the formula (14) represents the normalized distance information corresponding to the distance from the camera to the measurement subject.

The corrected first reflected component $E_1$ obtained by the latter half gate method contains a noise component, which results from ambient daylight and so on, and corresponds to the reflectance R. Similarly, the corrected second reflected component $E_2$ obtained by the first half gate method contains a noise component. However, by calculating the normalized distance information RT, the reflectance R is canceled as understood from the formula (14). Therefore, by utilizing the latter half gate method and the first half gate method, the reflectance information sensing operation and the reflectance correction information sensing operation become unnecessary.

On the other hand, a period $T_Y$, required for executing the distance information sensing operation, the distance correction information sensing operation, the reflectance information sensing operation and the reflectance correction information sensing operation, is in proportion to $$T_Y = 6 \times T_1 \quad (15)$$

As understood from comparing the formula (15) with the formula (11), by using the latter half gate method and the former half gate method in the distance information sensing operation, the time required for the sensing operation of the three-dimensional image data of the measurement subject is reduced to ¾ when compared to a case in which the methods are not used. If the electric charge accumulation stop period $t_C$ (see FIG. 12), in a case in which the latter half gate method and the former half gate method are not used, is approximately equal to $T_1$, $T_X = 10 \times T_1$. Accordingly, in this case, the period $T_Y$, required for executing the sensing operation of the three-dimensional image data when using the latter half gate method and the former half gate method, is ⅗ of the period $T_X$.

Figure 14:
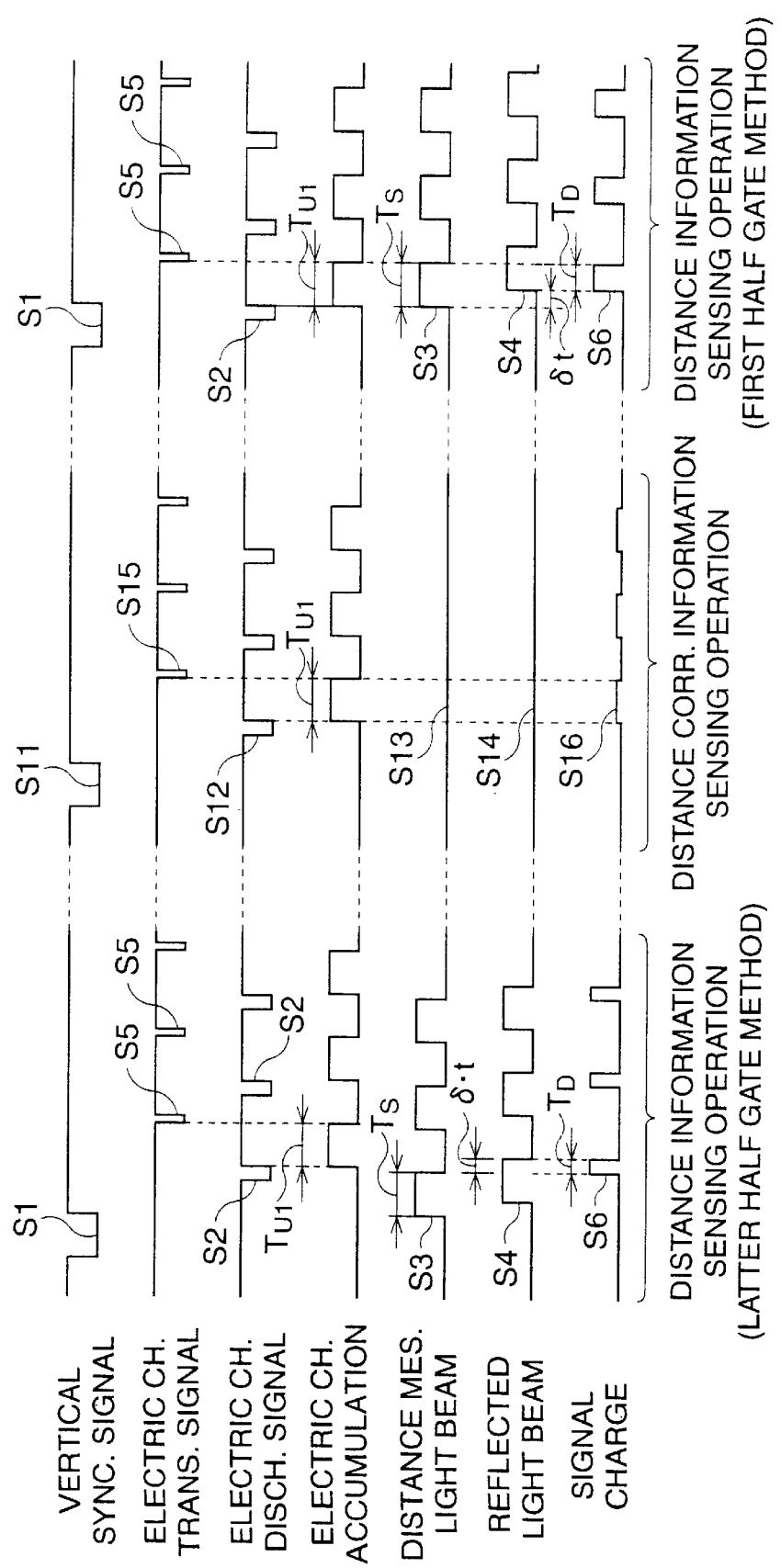
FIG. 14 is a view roughly showing a sequence in which the distance correction information sensing operation is carried out between the distance information sensing operation of the latter half gate method and the distance information sensing operation of the first half gate method.

When the latter half gate method and the former half gate method are used in the distance information sensing operation, it is preferable that the distance correction information sensing operation is carried out between the distance information sensing operation of the latter half gate method and the distance information sensing operation of the first half gate method. FIG. 14 roughly shows a sequence of the operation.

According to this sequence, since the execution of the distance correction information sensing operation is performed close to the execution of the distance information sensing operation of the latter half gate method, the sensing operations are hardly affected by time variation of ambient daylight, so that correction of the reflectance of the measurement subject can be performed with a higher accuracy.

In the measurement of the three-dimensional shape of the measurement subject, part of the sensing operations of the correction information regarding the reflectance of the measurement subject can be omitted so that the process time for the distance measurement can be reduced.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. 11-332677 (filed on Nov. 24, 1999) which are expressly incorporated herein, by reference, in its entirety.

What is claimed is:

1. A three-dimensional image capturing device, comprising:
   a light source that irradiates a distance measuring light beam, which irradiates a measurement subject and is a pulsed beam, said measurement subject reflecting said distance measuring light beam to generate a reflected light beam pulse;
   a first distance information sensing processor that senses a first reflected light component ($E_1$) for a first reflected light sensing period, said first reflected light component corresponding to a distance from said device to said measurement subject and containing a fall of said reflected light beam pulse;
   a second distance information sensing processor that senses a second reflected light component ($E_2$) for a second reflected light sensing period, said second reflected light component corresponding to said distance and containing a rise of said reflected light beam pulse, the length of said reflected light sensing period being equal to that of said first reflected light sensing period; and
   a normalized distance information calculating processor that obtains a ratio $(E_1)/(E_1+E_2)$, which is obtained by dividing said first reflected light component ($E_1$) by a sum of said first and second reflected light components $(E_1+E_2)$, as a normalized distance information corresponding to said distance.

2. A device according to claim 1, further comprising an ambient daylight sensing processor that senses an incident light, which is an ambient daylight component around said measurement subject, for an ambient daylight sensing period the length of which is equal to those of said first and second reflected light sensing periods, while said light source is turned OFF, said normalized distance information calculating processor obtaining said ratio, using calculation components, which are obtained by subtracting said ambient daylight component from said first and second reflected light components, respectively.

3. A device according to claim 2, wherein a sensing operation of said ambient daylight sensing processor is performed between sensing operations of said first and second distance information sensing processors.

4. A device according to claim 1, wherein each of said first and second distance information sensing processors comprises:
   a plurality of photoelectric conversion elements in each of which electric charge corresponding to an amount of said reflected light component is accumulated;

a signal charge holding unit disposed adjacent to each of said photoelectric conversion elements;

an electric charge discharging processor that discharges unwanted charge accumulated in each of said photoelectric conversion elements, so that an accumulating operation of signal charge is started in each of said photoelectric conversion elements;

a signal charge transfer processor that transfers said signal charge accumulated in said photoelectric conversion elements to said signal charge holding unit; and a signal charge integrating processor that drives said electric charge discharging processor and said signal charge transfer processor alternately, so that said signal charge is integrated in said signal charge holding unit to sense said distance.

5. A device according to claim 2, wherein said ambient daylight sensing processor comprises:

a plurality of photoelectric conversion elements in each of which an electric charge corresponding to an amount of said incident light is accumulated;

a signal charge holding unit disposed adjacent to each of said photoelectric conversion elements;

an electric charge discharging processor that discharges unwanted charge accumulated in each of said photoelectric conversion elements, so that an accumulating operation of signal charge is started in each of said photoelectric conversion elements;

a signal charge transfer processor that transfers said signal charge accumulated in said photoelectric conversion elements to said signal charge holding unit; and a signal charge integrating processor that drives said electric charge discharging processor and said signal charge transfer processor alternately, so that said signal charge is integrated in said signal charge holding unit to sense distance correction information corresponding to an amount of said ambient daylight component.

* * * * *